J. B. UNDERWOOD.
METHOD OF ROASTING COFFEE.
No. 177,592. Patented May 16, 1876.
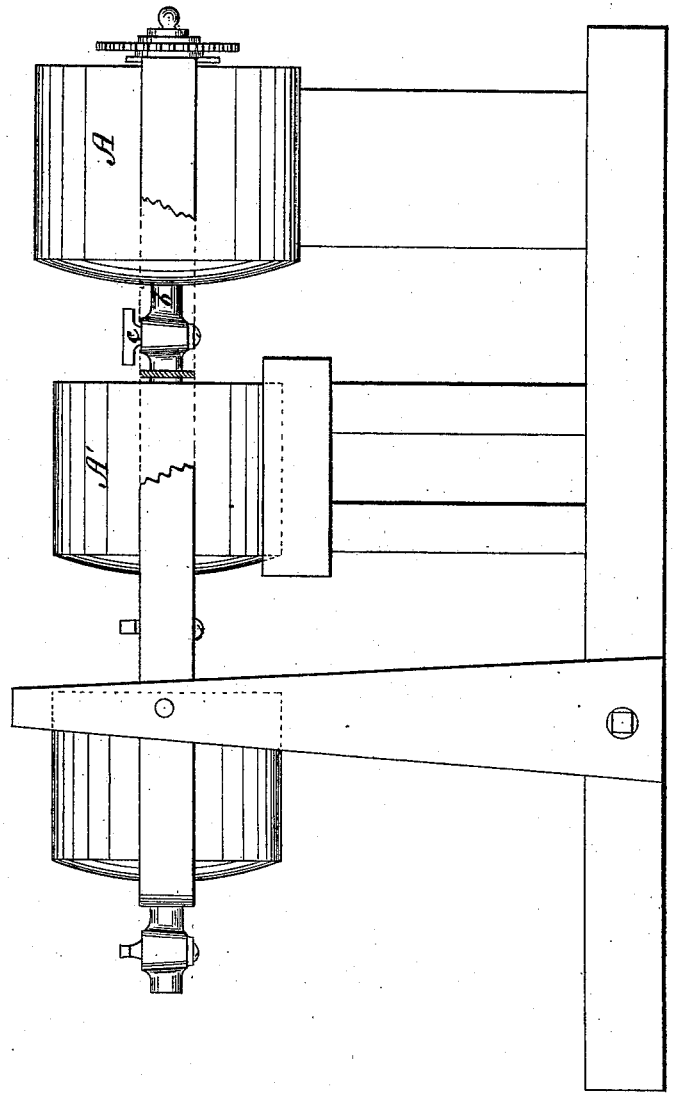
WITNESSES:
INVENTOR:
J. B. Underwood
BY
ATTORNEYS.
N. PETERS, PHOTO-LITHOGRAPHER, WASHINGTON, D. C.

UNITED STATES PATENT OFFICE.

JOSEPH B. UNDERWOOD, OF FAYETTEVILLE, NORTH CAROLINA, ASSIGNOR OF ONE-HALF HIS RIGHT TO WILLIAM A. WHITEHEAD, OF SAME PLACE.

IMPROVEMENT IN METHODS OF ROASTING COFFEE.

Specification forming part of Letters Patent No. 177,592, dated May 16, 1876; application filed April 15, 1875.

*To all whom it may concern:*

Be it known that I, JOSEPH B. UNDERWOOD, of Fayetteville, in the county of Cumberland and State of North Carolina, have invented a new and Improved Method of Roasting Coffee; and I do hereby declare that the following is a full, clear, and exact description of the same, reference being had to the accompanying drawing, forming a part of this specification, in which the figure is a side elevation.

The object of this invention is to improve the quality of roasted coffee, and to obviate, to a great extent, the loss in weight; and it consists in a method of roasting and cooling coffee in separate chambers, having an air-tight communication with each other, through which one charge may be transferred from one chamber to the other without exposure to the air, and whereby, also, the volatile products that arise from the roasting charge are utilized by being conveyed to the cooling charge, where the said flavoring and aromatic exhalations are restored in a gaseous form to the coffee as it is cooled, and the roasted coffee preserved and rendered less susceptible to the damaging effects of the weather.

In carrying out my invention I prefer the following means as being best adapted to the requirements of my method:

Two or more revolving chambers, A A', are arranged so as to have an air-tight communication, *b*, with each other through a pipe, which may be either opened or closed by a suitable valve or cut-off, *c*. One of said chambers, A, constitutes the roasting-receptacle, and the other, A', the cooling and condensing receptacle.

Now, when a charge of coffee is wanted it is first roasted in the roasting-chamber, and then transferred to the cooling-chamber without exposure to the air, through the air-tight communication *b*, by turning the chambers into a vertical position, and, the roasting-chamber being recharged, the triple process of roasting, cooling, and condensing is carried on at the same time.

The cooling-chamber is subjected to a low temperature by means of water or by other suitable means, and at the same time the aromatic and volatile exhalations from the roasting-chamber are allowed to pass to the said condensing-chamber, where they are quickly reabsorbed by the beans as they become cooled.

By means of this method all of the aroma and flavoring-extracts are restored to the coffee, the loss in weight of the coffee-beans from the roasting obviated, and the beans provided with a protective coating of reabsorbed oils, which render them less sensitive to the damaging effects of weather.

I am aware of the fact that coffee has been roasted in a chamber provided with devices for receiving and condensing the exhalations, and afterward returning the same to the roasted coffee in the form of a liquid; but in this method the liquid is not evenly distributed among the beans, and while some are surcharged and actually clogged, others are entirely untouched. This method is also objectionable for the reason that the operation of roasting cannot be made continuous, and, moreover, the beans will not properly reabsorb the exhaled odors, except when in a cooling-chamber, and it could not, therefore, take place in the roasting-chamber unless the fires are drawn and the chamber cooled, which would involve many practical embarrassments.

By means of my method it will be seen that, while the aroma is being developed from the roasting charge in the form of a vapor, it is also, at the same time, being reabsorbed in the form of a vapor by the cooling charge, the operation being thus made continuous. The beans are also being recharged with the aroma while cooling, which is the only condition under which they can properly and fully reabsorb the evolved aroma, and the impregnation also is thorough and uniform.

Having thus described my invention, what I claim as new is—

The herein-described method of roasting coffee in a closed chamber, and transferring the same to a cooling-chamber without exposure to the air, where the exhalations that arise from the next roasting charge are condensed and restored to the charge which is being cooled, substantially as and for the purpose set forth.

The above specification of my invention signed by me this 13th day of April, 1875.

J. B. UNDERWOOD.

Witnesses:
SOLON C. KEMON,
CHAS. A. PETTIT.